US012798401B2

(12) United States Patent
Mazaika

(10) Patent No.: US 12,798,401 B2
(45) Date of Patent: Nov. 17, 2026

(54) MODULAR CHASSIS FOR AN ELECTRIC VEHICLE

(71) Applicant: COULOMB SOLUTIONS, INC., Livermore, CA (US)

(72) Inventor: David Michael Mazaika, Livermore, CA (US)

(73) Assignee: COULOMB SOLUTIONS, INC., Livermore, CA (US)

( * ) Notice: Subject to any disclaimer, the term of this patent is extended or adjusted under 35 U.S.C. 154(b) by 200 days.

(21) Appl. No.: 18/829,887

(22) Filed: Sep. 10, 2024

(65) Prior Publication Data

US 2024/0424919 A1 Dec. 26, 2024

Related U.S. Application Data

(63) Continuation of application No. PCT/US2022/021432, filed on Mar. 22, 2022.

(51) Int. Cl.

| | |
|---|---|
| ***B60L 50/64*** | (2019.01) |
| ***B60K 1/04*** | (2019.01) |
| ***B60L 1/00*** | (2006.01) |

(52) U.S. Cl.

CPC ................ *B60L 50/64* (2019.02); *B60K 1/04* (2013.01); *B60L 1/003* (2013.01)

(58) Field of Classification Search

CPC ............ B60L 50/64; B60L 1/003; B60K 1/04

See application file for complete search history.

(56) References Cited

U.S. PATENT DOCUMENTS

| | | | | |
|---|---|---|---|---|
| 5,853,058 | A * | 12/1998 | Endo | F16D 11/14 180/68.5 |
| 8,739,908 | B2 * | 6/2014 | Taniguchi | B62J 43/16 180/68.5 |
| 10,252,632 | B2 * | 4/2019 | Hernandez Lopez | B60L 3/0023 |
| 10,562,404 | B1 * | 2/2020 | Khaligh | B60L 50/10 |
| 10,780,767 | B2 * | 9/2020 | Rawlinson | B62D 25/2036 |
| 11,040,610 | B2 * | 6/2021 | Sloan | B60L 50/66 |

(Continued)

FOREIGN PATENT DOCUMENTS

| | | |
|---|---|---|
| CN | 203434219 U | 2/2014 |
| CN | 107240651 A | 10/2017 |

(Continued)

OTHER PUBLICATIONS

International Patent Application No. PCT/US2022/021432; Int'l Search Report and the Written Opinion; dated Jul. 1, 2022; 10 pages.

(Continued)

*Primary Examiner* — Jacob B Meyer

(74) *Attorney, Agent, or Firm* — BAKER HOSTETLER, LLP

(57) ABSTRACT

A vehicle chassis system may comprise a first module comprising a front axle of a vehicle. The vehicle chassis system may comprise a second module comprising a container that encloses a plurality of battery assemblies. The vehicle chassis system may comprise a third module comprising a rear axle of the vehicle. The second module may be configured to be connected to and interposed between the first module and the third module. The chassis constructed with the second module provides torsional rigidity to the chassis.

10 Claims, 12 Drawing Sheets

1000

(56) References Cited

U.S. PATENT DOCUMENTS

| | | | | |
|---|---|---|---|---|
| 11,840,137 | B2 * | 12/2023 | Mazaika | B60K 1/04 |
| 12,097,756 | B2 * | 9/2024 | Mazaika | B60K 1/04 |
| 12,409,718 | B2 * | 9/2025 | Wheeler | B60K 1/04 |
| 12,427,845 | B2 * | 9/2025 | Mazaika | B60K 1/04 |
| 12,502,942 | B1 * | 12/2025 | Murphy | B60K 1/04 |
| 2011/0024207 | A1 * | 2/2011 | Higashino | H01M 10/625<br>429/151 |
| 2012/0223113 | A1 * | 9/2012 | Gaisne | H01M 50/249<br>224/538 |
| 2022/0348065 | A1 * | 11/2022 | Harmon | B60K 1/04 |
| 2022/0348275 | A1 * | 11/2022 | Harmon | B60K 1/04 |
| 2023/0062143 | A1 * | 3/2023 | Zandbergen | B60K 1/04 |
| 2023/0070769 | A1 * | 3/2023 | Wheeler | B60K 1/04 |
| 2023/0242195 | A1 * | 8/2023 | Beals | B62D 27/023<br>180/65.1 |
| 2023/0249534 | A1 * | 8/2023 | Kim | B60K 1/04<br>180/68.5 |
| 2024/0149654 | A1 * | 5/2024 | Kvalden | B60L 3/0007 |
| 2024/0166040 | A1 * | 5/2024 | Coupal-Sikes | H01M 50/204 |
| 2024/0208315 | A1 * | 6/2024 | Grinstead | B60K 17/356 |
| 2024/0347832 | A1 * | 10/2024 | Jang | H01M 10/613 |
| 2024/0424919 | A1 * | 12/2024 | Mazaika | H01M 50/244 |
| 2025/0115108 | A1 * | 4/2025 | Lin | B60K 1/04 |

FOREIGN PATENT DOCUMENTS

| | | |
|---|---|---|
| CN | 108011061 A | 5/2018 |
| CN | 112477573 A | 3/2021 |

OTHER PUBLICATIONS

International Patent Application No. PCT/US2022/021432; Int'l Preliminary Report on Patentability; dated Oct. 3, 2024; 9 pages.

* cited by examiner

1000

MODULAR CHASSIS FOR AN ELECTRIC VEHICLE

CROSS-REFERENCE TO RELATED APPLICATIONS

This application is a Bypass Continuation of PCT/US2022/021432, filed Mar. 22, 2022, entitled MODULAR CHASSIS FOR AN ELECTRIC VEHICLE, which are hereby incorporated by reference in its entirety.

TECHNICAL FIELD

The present disclosure generally relates to a modular chassis for an electric vehicle.

BACKGROUND

Vehicles that run on battery power, such as hybrid vehicles and electric vehicles, are becoming increasingly popular. Such vehicles provide a number of advantages over vehicles that do not utilize battery power. For example, such vehicles save drivers money, as no fuel is required. Such vehicles are also environmentally friendly as they do not emit pollutants. However, some electric vehicles may need to power a large quantity of components and/or drive long distances. It may be difficult to provide sufficient battery power for these electric vehicles. Therefore, improvements in batteries for electric vehicles are desirable.

DISCLOSURE

The present application is further understood when read in conjunction with the appended drawings. For the purpose of illustrating the subject matter, there are shown in the drawings exemplary aspects of the subject matter; however, the presently disclosed subject matter is not limited to the specific methods, devices, and systems disclosed.

Systems and methods are disclosed herein for a modular chassis for an electric vehicle. A vehicle chassis system may comprise a first module. The first module may comprise a front axle of a vehicle. The vehicle chassis system may comprise a second module. The second module may comprise a container that encloses a plurality of battery assemblies connected to a power distribution unit. The vehicle chassis system may comprise a third module. The third module may comprise a rear axle of the vehicle. The second module is configured to be connected to and interposed between the first module and the third module. The plurality of battery assemblies are configured to provide power to at least one component of the vehicle located in the first module or the third module via the power distribution unit.

A method for assembling a chassis for a vehicle may comprise attaching a first module comprising a front axle of a vehicle to a front end of a second module. The second module may comprise a container that encloses a plurality of battery assemblies connected to a power distribution unit. In some instances the container is mounted to frame rails forming a portion of the chassis. In some instances the containers mounting is one of over and through the side of the frame rails. The method may comprise attaching a back end of the second module to a front end of a third module comprising a rear axle of the vehicle. The plurality of battery assemblies may be configured to provide power to at least one component of the vehicle located in the first module or the third module via the power distribution unit.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to features that solve any or all disadvantages noted in any part of this disclosure.

DRAWINGS

The present application is further understood when read in conjunction with the appended drawings. For the purpose of illustrating the subject matter, there are shown in the drawings exemplary aspects of the subject matter; however, the presently disclosed subject matter is not limited to the specific methods, devices, and systems disclosed. In the drawings.

The components in the figures are not necessarily to scale, emphasis instead being placed upon illustrating the principles of the disclosure. All descriptions and callouts in the Figures and all content therein are hereby incorporated by this reference as if fully set forth herein. All citations are hereby incorporated by this reference as if fully set forth herein. Aspects of the disclosure will now be described in detail with reference to the drawings, wherein like reference numbers refer to like elements throughout, unless specified otherwise.

FURTHER DISCLOSURE

The present disclosure may be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular exemplars by way of example only and is not intended to be limiting of the claimed disclosure.

Figure 1:
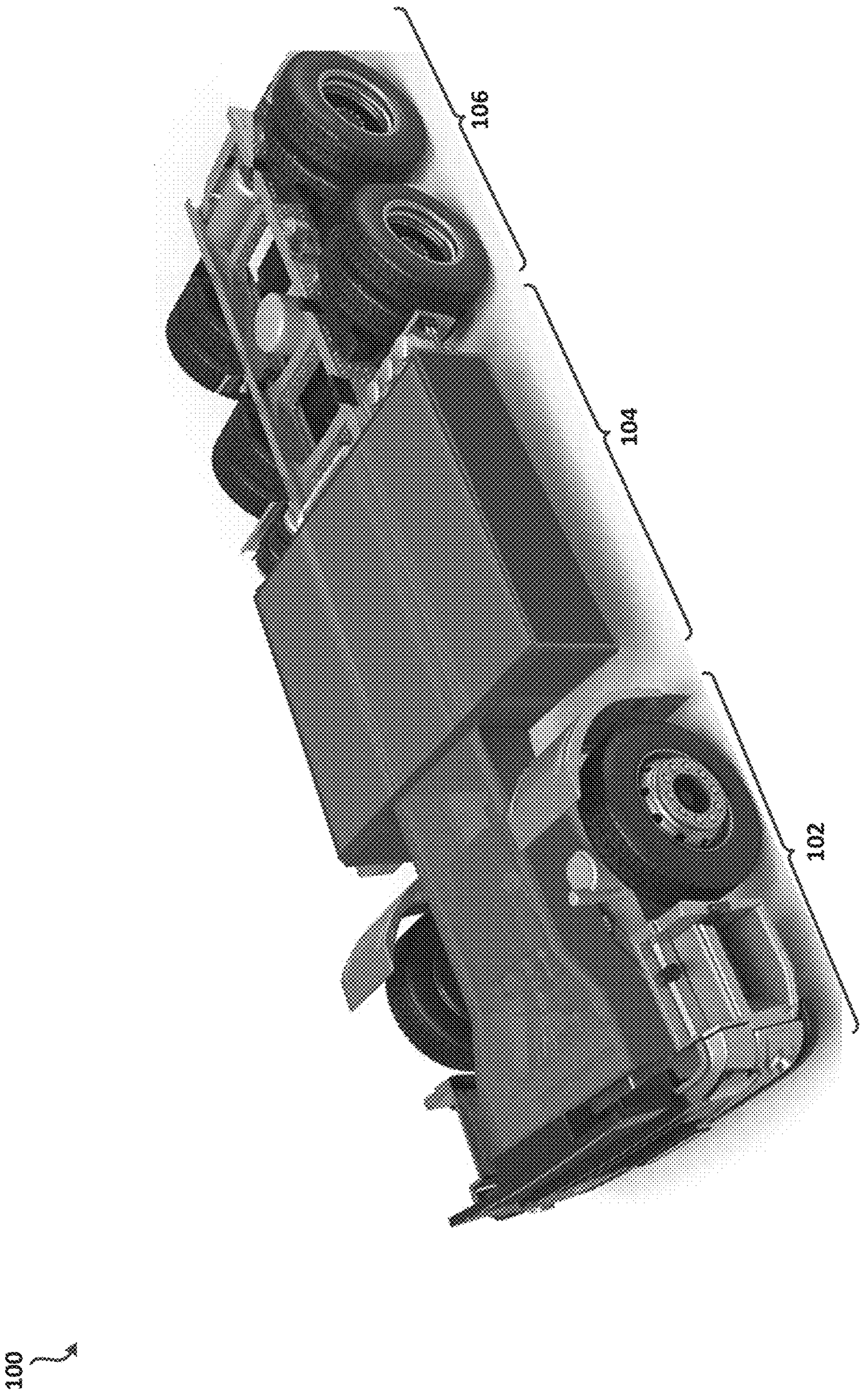
FIG. 1 shows an example electric vehicle chassis system including a battery module.

Presently disclosed are aspects of systems for electric vehicle battery modules and methods for assembling such electric vehicle battery modules. FIG. 1 shows a chassis system 100 for an electric vehicle. The system 100 includes a first module 102, a second module 104, and a third module 106. The first module 102 may include mounts for a front axle, suspension, and steering of the electric vehicle. The first module 102 may additionally include an accessory module associated with one or more accessories of the electric vehicle. The third module 106 may include mounts for rear axles and suspension of the electric vehicle.

The second module 104 may be an electric vehicle battery module. The electric vehicle battery module may be a large, structural battery pack that is configured to provide power to at least one component of the electric vehicle. For example, the electric vehicle battery module may include a one or more battery packs configured to provide power to at least one component of the electric vehicle. The at least one component may be located in the first module 102 or the third module 106. For example, the at least one component can include the at least one component comprises a main driver inverter, a motor, a steering pump, an AC compressor, a DC-DC converter, a cabin heater, a cooling system, a charger, an air compressor, an accessory inverter, and/or any other component of the electric vehicle. Exemplary electric vehicle battery modules are discussed below in more detail with regard to FIGS. 3-7.

The second module 104 is configured to be connected to and interposed between the first module 102 and the third module 106. In some exemplars, the second module 104 may be bolted, welded, or otherwise attached to the first module 102 and the third module 106 so that the second module 104 is positioned in between the first module 102 and the third module 106.

In other exemplars, the second module 104 may be connected to frame rails that run through the first module 102 and the third module 106 so that the second module 104 is positioned in between the first module 102 and the third module 106. For example, the second module 104 may be positioned in between the first module 102 and the third module 106 so that the frame rails run though the second module 104. In this manner, the frame rails of the vehicle may be used to suspend the second module 104. By connecting the second module 104 to existing frame rails, track manufacturers may be able to integrate the second module 104 into an existing chassis without the need for time-consuming or expensive chassis redesign.

In some exemplary implementations, the dimensions of the second module 104 may be selected in order to maximize the quantity of battery packs that are able to fit within the second module 104. For example, the second module 104 may be 80 to 100 inches in length, 80 to 100 inches wide, and 20-40 inches tall. The second module 104 may include, for example, one, two, three, four, five, six, seven, eight, nine, or any other quantity of battery packs. However, it should be appreciated that the second module 104 may have any other suitable dimensions that allow for a sufficient quantity of battery packs to be incorporated within the second module 104.

Figure 2:
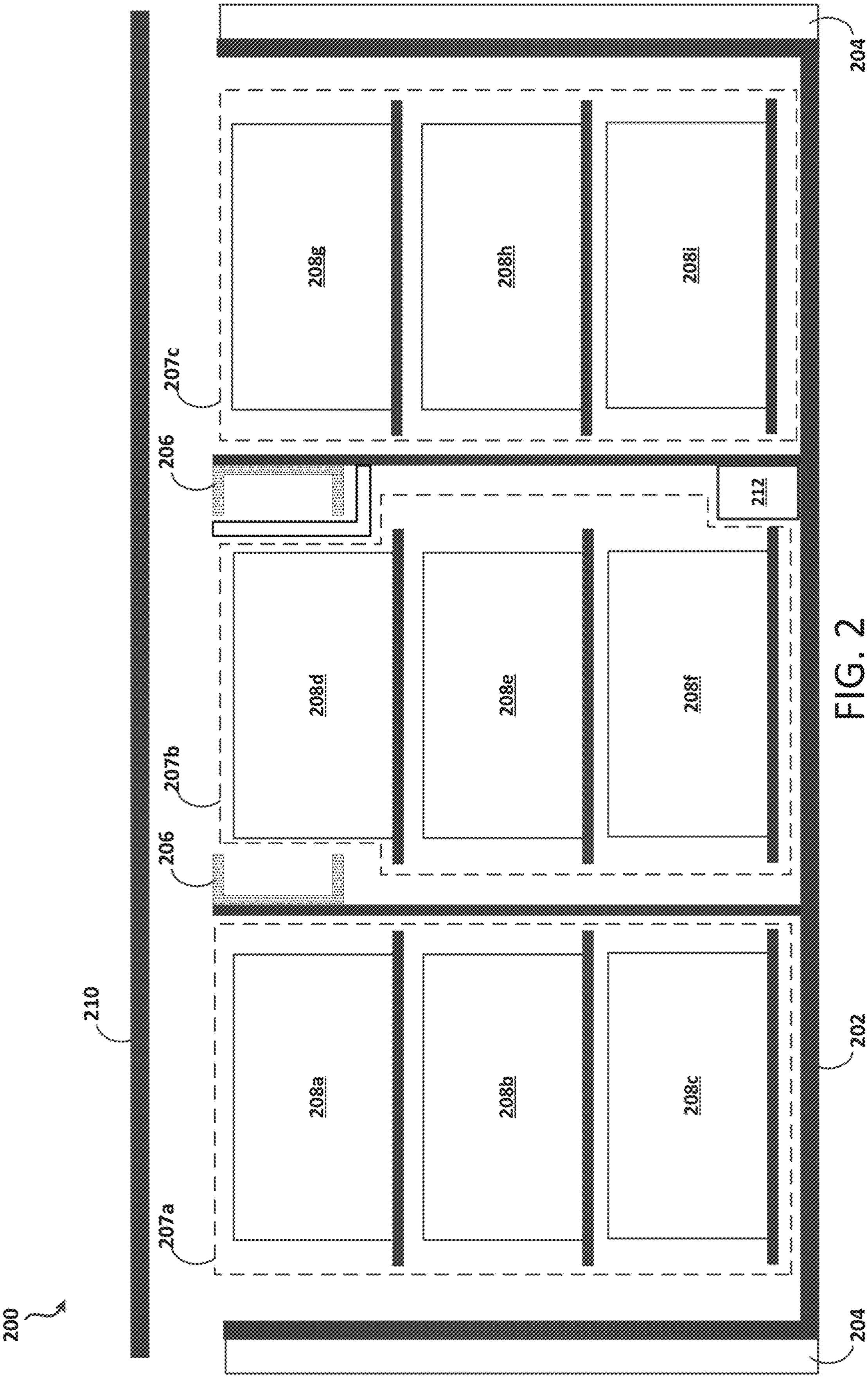
FIG. 2 shows an example electric vehicle battery module.

As mentioned above, the second module 104 may be an electric vehicle battery module bolted to the frame rails of a chassis. FIG. 2 shows an example electric vehicle battery module 200. The electric vehicle battery module 200 includes a container 202 configured to be mounted to frame rails 206 (i.e., C-channels) forming at least a portion of a frame of an electric vehicle. The electric vehicle may be any vehicle, including a truck, a van, or a trailer. The electric vehicle battery module 200 includes a lid 210 configured to cover an open top of the container 202.

The electric vehicle battery module 200 includes a plurality of battery assemblies 207*a-c* enclosed within the container 202.

The plurality of battery assemblies 207*a-c* may be connected to a power distribution unit (PDU). The plurality of battery assemblies 207*a-c* provide power to at least one component of the electric vehicle via the PDU. The PDU to which the plurality of battery assemblies 207*a-c* are connected may be located in the accessory module (i.e., in the first module 102). Optionally, the PDU may instead be located inside of the container 202. A PDU 212 may be included inside of the container 202. For example, the PDU 212 may include connections to a motor and/or inverter(s) of the electric vehicle. By including the PDU 212 inside of the container 202, the PDU in the accessory module may be eliminated, thus reducing weight and lowering cost.

The plurality of battery assemblies 207*a-c* may each include a plurality of battery packs. For example, the battery assembly 207*a* includes battery packs 208*a-c*, the battery assembly 207*b* includes battery packs 208*d-f*, and the battery assembly 207*c* includes battery packs 208*g-i*. Each of the battery packs 208*g-i* may be of substantial weight. For example, each of the battery packs 208*g-i* may weigh about 1000 pounds. The plurality of battery assemblies 207*a-c* may be separated from one another by internal vertical walls of the container 202. The container 202 may be mounted to frame rails 206 by bolting an upper portion of the internal vertical walls of the container 202 to the frame rails 206.

In some exemplars, aspects include the electric vehicle battery module 200 having a layer of material 204 connected to at least one external side or end wall of the container 202. The layer of material may be configured to protect the plurality of battery assemblies 207*a-c* from damage. For example, the layer of material may be configured to protect the plurality of battery assemblies 207*a-c* from damage during impact. The layer of material 204 may be of any thickness. For example, the layer of material 204 may have a thickness of one, two, three, four, or five inches. The layer of material 204 may be, for example, one or more crush beams. The layer of material 204 may be riveted on, bolted on, and/or glued on to both external end walls of the container 202.

Figure 3:
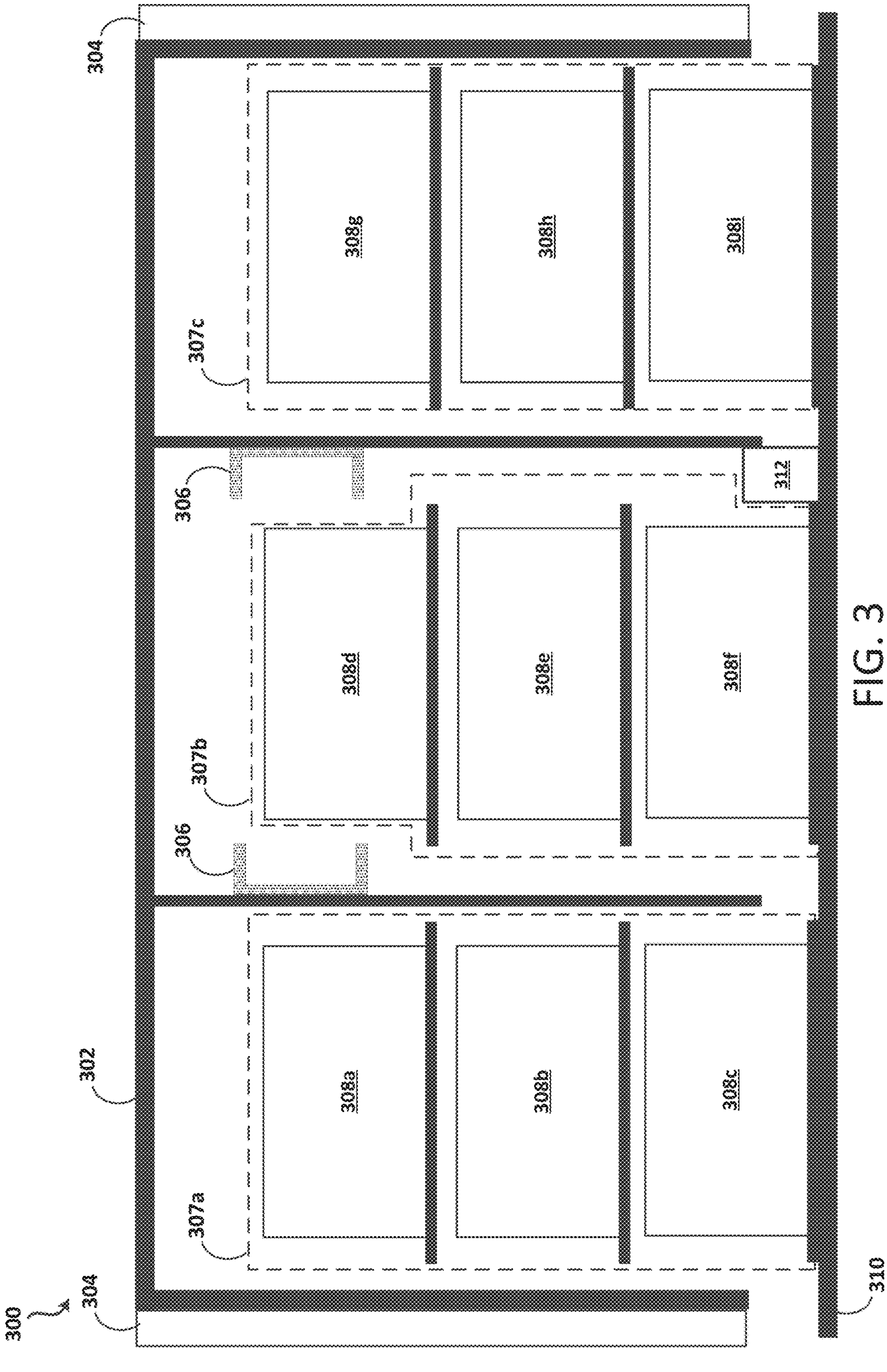
FIG. 3 shows another example electric vehicle battery module.

FIG. 3 shows aspects of an electric vehicle battery module 300. The electric vehicle battery module 300 includes a container 302 configured to be mounted to frame rails 306 (i.e., C-channels) forming at least a portion of a frame of an electric vehicle. The electric vehicle may be any vehicle, including a truck, a van, or a trailer. The electric vehicle battery module 300 includes a plate 310 configured to fit into an open bottom of the container 302.

The electric vehicle battery module 300 includes a plurality of battery assemblies 307*a-c* mounted to the plate 310. The plate 310 including the mounted battery assemblies 307*a-c* may be lifted to fit into an open bottom of the container 302 so that the battery assemblies 307*a-c* are enclosed within the container 302.

The plurality of battery assemblies 307*a-c* may be connected to a PDU. The plurality of battery assemblies 307*a-c* provide power to at least one component of the electric vehicle via the PDU. The plurality of battery assemblies 307*a-c* may be connected to a power distribution unit (PDU). The plurality of battery assemblies 307*a-c* provide power to at least one component of the electric vehicle via the PDU. The PDU to which the plurality of battery assemblies 307*a-c* are connected may be located in the accessory module (i.e., in the first module 102). Optionally, the PDU may instead be located inside of the container 302, such as on the plate

310. A PDU 312 may be included inside of the container 302. For example, the PDU 312 may include connections to a motor and/or inverter(s) of the electric vehicle. By including the PDU 312 inside of the container 302, the PDU in the accessory module may be eliminated, thus reducing weight and lowering cost.

The plurality of battery assemblies 307*a-c* may each include a plurality of battery packs. For example, the battery assembly 307*a* includes battery packs 308*a-c*, the battery assembly 307*b* includes battery packs 308*d-f*, and the battery assembly 307*c* includes battery packs 308*g-i*. Each of the battery packs 308*g*-I may be of substantial weight. For example, each of the battery packs 308*g-i* may weigh about 1000 pounds. The plurality of battery assemblies 307*a-c* may be separated from one another by internal vertical walls of the container 302 forming a portion of the chassis. In some instances the container 302 may be mounted to frame rails 306 by bolting an upper portion of the internal vertical walls of the container 302 to the frame rails 306. For example, the container 302 may be mounted to frame rails 306 before lifting the plate 310 including the mounted battery assemblies

307*a-c* into an open bottom of the container 302 so that the battery assemblies 307*a-c* are enclosed within the container 302.

In some exemplars, the electric vehicle battery module 300 includes a layer of material 304 connected to at least one external side or end wall of the container 302. The layer of material may be configured to protect the plurality of battery assemblies 307*a-c* from damage. For example, the layer of material may be configured to protect the plurality of battery assemblies 307*a-c* from damage during impact. The layer of material 304 may be of any thickness. For example, the layer of material 304 may have a thickness of one, two, three, four, or five inches. The layer of material 304 may, for example, be connected to both external end walls of the container 302.

In some exemplars, the plurality of battery assemblies 307*a-c* may be configured to be removed from the container 302 by lowering the plate 310 including the mounted plurality of battery assemblies 307*a-c* from the open bottom of the container 302. In this manner, the plurality of battery assemblies 307*a-c* may be easily removed and/or replaced as needed.

Figure 4:
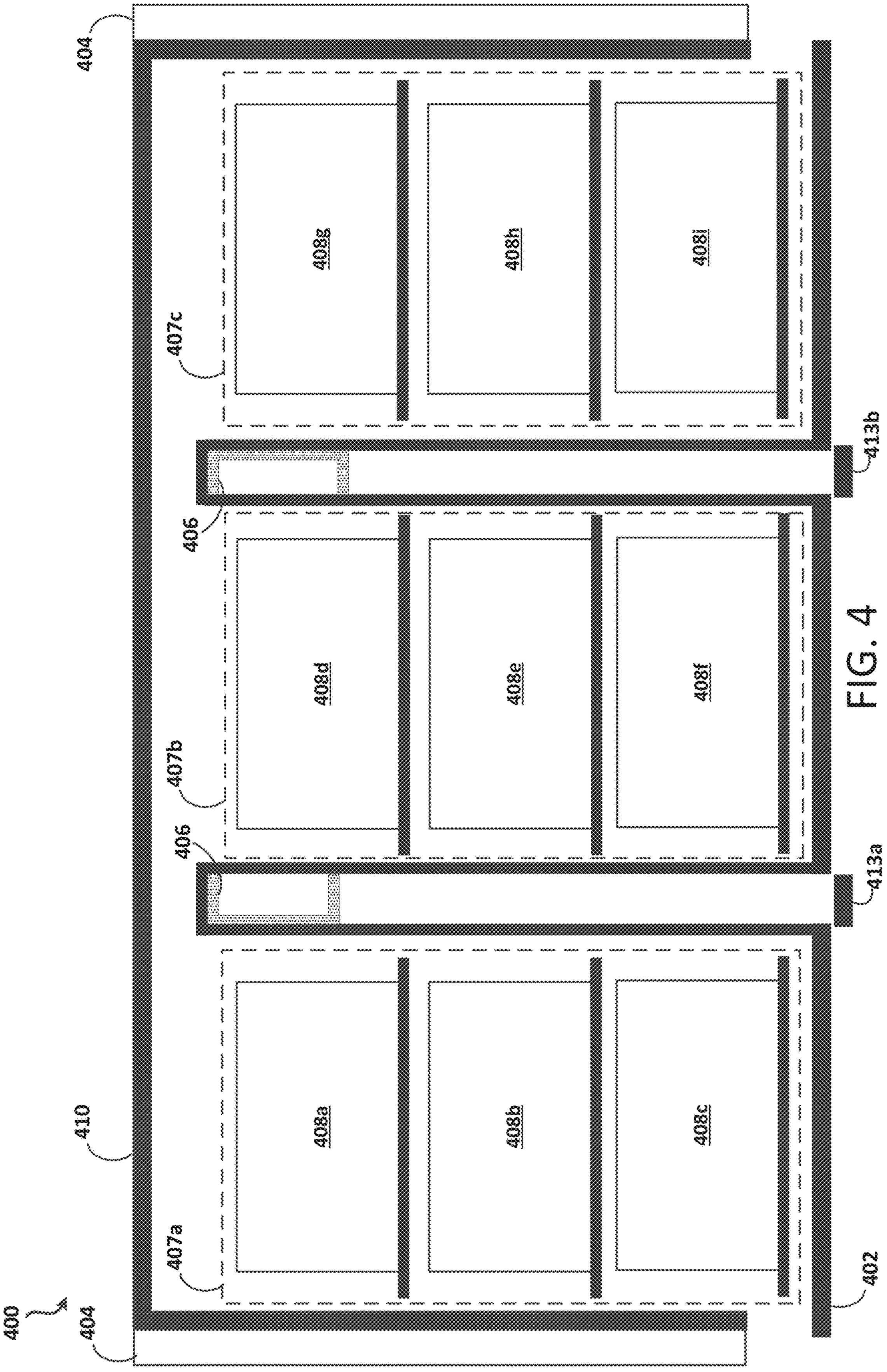
FIG. 4 shows another example electric vehicle battery module.

In some exemplars, the second module 104 may be an electric vehicle battery module that is assembled and dropped over existing frame rails. FIG. 4 shows another example electric vehicle battery module 400. The electric vehicle battery module 400 includes a container 402 configured to be lowered over frame rails 406 (i.e., C-channels) forming at least a portion of a frame of an electric vehicle. The electric vehicle may be any vehicle, including a truck, a van, or a trailer. The electric vehicle battery module 400 includes a lid 410 configured to cover an open top of the container 402.

The electric vehicle battery module 400 includes a plurality of battery assemblies 407*a-c* mounted to a bottom surface of the container 402. The container 402 including the mounted battery assemblies 407*a-c* may be lowered down over the frame rails 406. The plurality of battery assemblies 407*a-c* may be separated from one another by vertical walls of the container 402. The container 402 may be lowered over the frame rails 406 so the vertical walls of the container 402 fit over the frame rails 406. After the container 402 including the mounted battery assemblies 407*a-c* is lowered over the frame rails 406, the lid 410 may be lowered over the container 402 so that the battery assemblies 407*a-c* are enclosed between the container 402 and the lid 402.

The plurality of battery assemblies 407*a-c* may each include a plurality of battery packs. For example, the battery assembly 407*a* includes battery packs 408*a-c*, the battery assembly 407*b* includes battery packs 408*d-f*, and the battery assembly 407*c* includes battery packs 408*g-i*. Each of the battery packs 408*g-i* may be of substantial weight. For example, each of the battery packs 408*g-i* may weigh about 1000 pounds. The plurality of battery assemblies 407*a-c* may be connected to a PDU. The plurality of battery assemblies 407*a-c* provide power to at least one component of the electric vehicle via the PDU.

In some exemplars, the electric vehicle battery module 400 includes a layer of material 404 connected to at least one external side or end wall of the lid 410. The layer of material may be configured to protect the plurality of battery assemblies 407*a-c* from damage. For example, the layer of material may be configured to protect the plurality of battery assemblies 407*a-c* from damage during impact. The layer of material 404 may be of any thickness. For example, the layer of material 404 may have a thickness of one, two, three, four, or five inches.

In some exemplars, the electric vehicle battery module 400 includes cover plates 413*a-b*. The cover plates 413*a-b* may be bolted in between the vertical walls of the container 402 to cover an opening between the vertical walls of the container 402. The cover plates 413*a-b* may prevent the opening between the vertical walls of the container 402 from filling up with dirt, leaves, debris, etc. The cover plates 413*a-b* may additionally, or alternatively, provide the container 402 with additional structural support. For example, the cover plates 413*a-b* may prevent the container 402 from collapsing in on itself.

Figure 5:
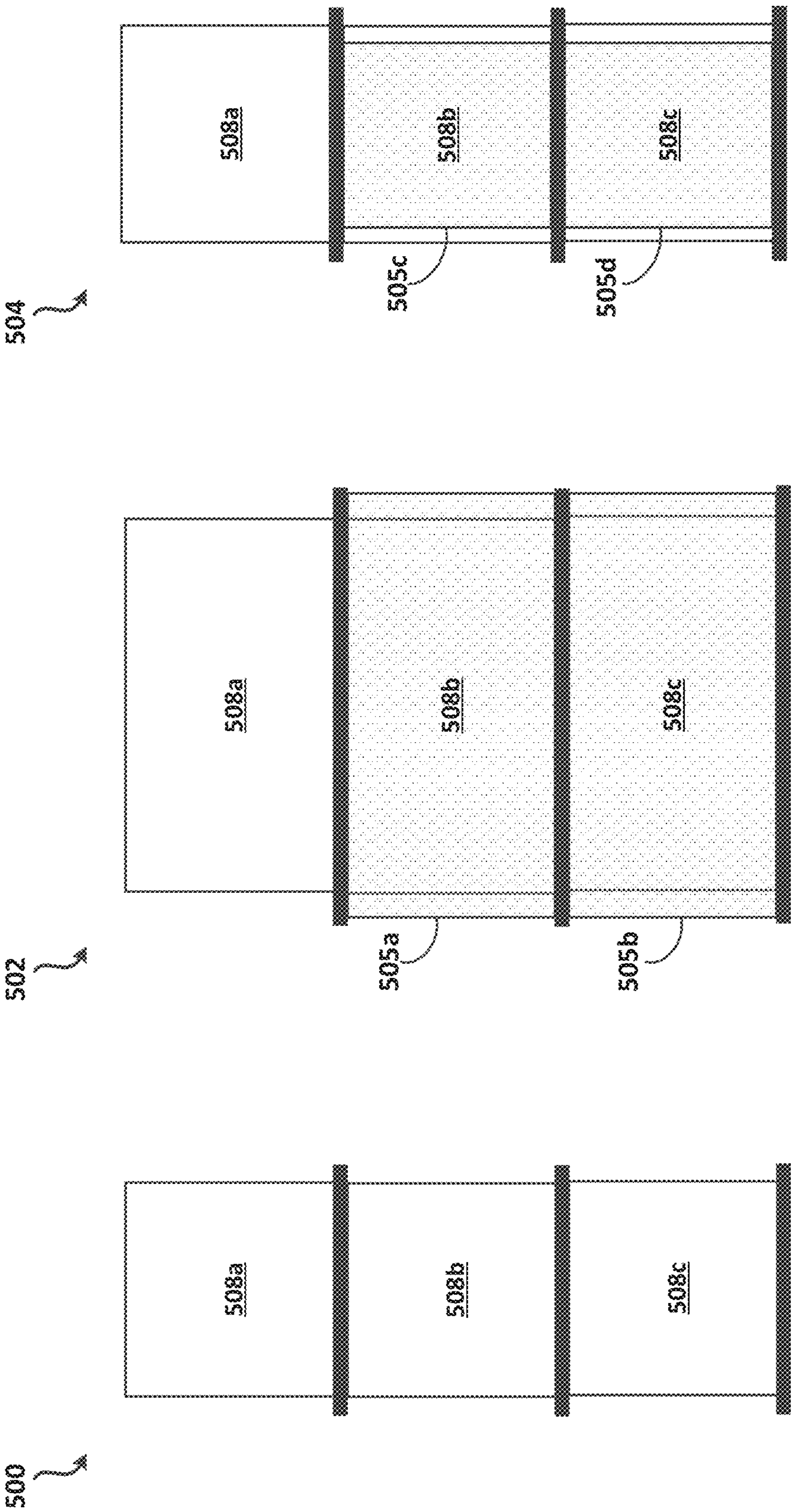
FIG. 5 shows example battery packs for use in an electric vehicle battery module.

As discussed above with regard to FIGS. 2-4, an electric battery module may include a plurality of battery assemblies. Each of the plurality of battery assemblies may include a plurality of battery packs, modules, or cell strings. The battery packs in each of the plurality of battery assemblies may be bolted together. FIG. 5 shows example battery packs bolted together to form a battery assembly. FIG. 5 shows a view 500 illustrating a front-end of a battery assembly that has been formed by bolting together battery packs 508*a-c*, a view 502 illustrating a side of the battery assembly that has been formed by bolting together battery packs 508*a-c*, and a view 504 illustrating a back end of the battery assembly that has been formed by affixing which may include but is not limited to bolting together battery packs 508*a-c*. The skilled artisan and those of ordinary skill in the art will recognize that there are a plethora of affixing means which may be used in attached the packs and that those attachments would be within the scope of the disclosure.

The battery packs 508*a-c* may be bolted together using solid vertical support plates 505*a-d*. Referring to the view 502, the sides of the battery packs 508*a-c* may be bolted together using vertical support plates 505*a-b*. For example, battery pack 508*b* may be stacked on top of battery pack 508*c*, and the vertical support plate 505*b* may be bolted to a side of the battery pack 508*b* and a side of the battery pack 508*c* so as to connect the battery packs 508*b-c*. Likewise, battery pack 508*a* may be stacked on top of battery pack 508*b*, and the vertical support plate 505*a* may be bolted to a side of the battery pack 508*a* and a side of the battery pack 508*b* so as to connect the battery packs 508*a-b*. Referring to the view 504, the vertical support plate 505*d* may be bolted to a back end of the battery pack 508*b* and a back end of the battery pack 508*c* so as to further connect the battery packs 508*b-c*. Likewise, the vertical support plate 505*c* may be bolted to a back end of the battery pack 508*a* and a back end of the battery pack 508*b* so as to further connect the battery packs 508*a-b*. However, as shown in the view 502, no vertical support plates may be utilized on the front end of the battery assembly, as electrical and water connections on the front end of the battery assembly may need to be accessible.

Figure 6:
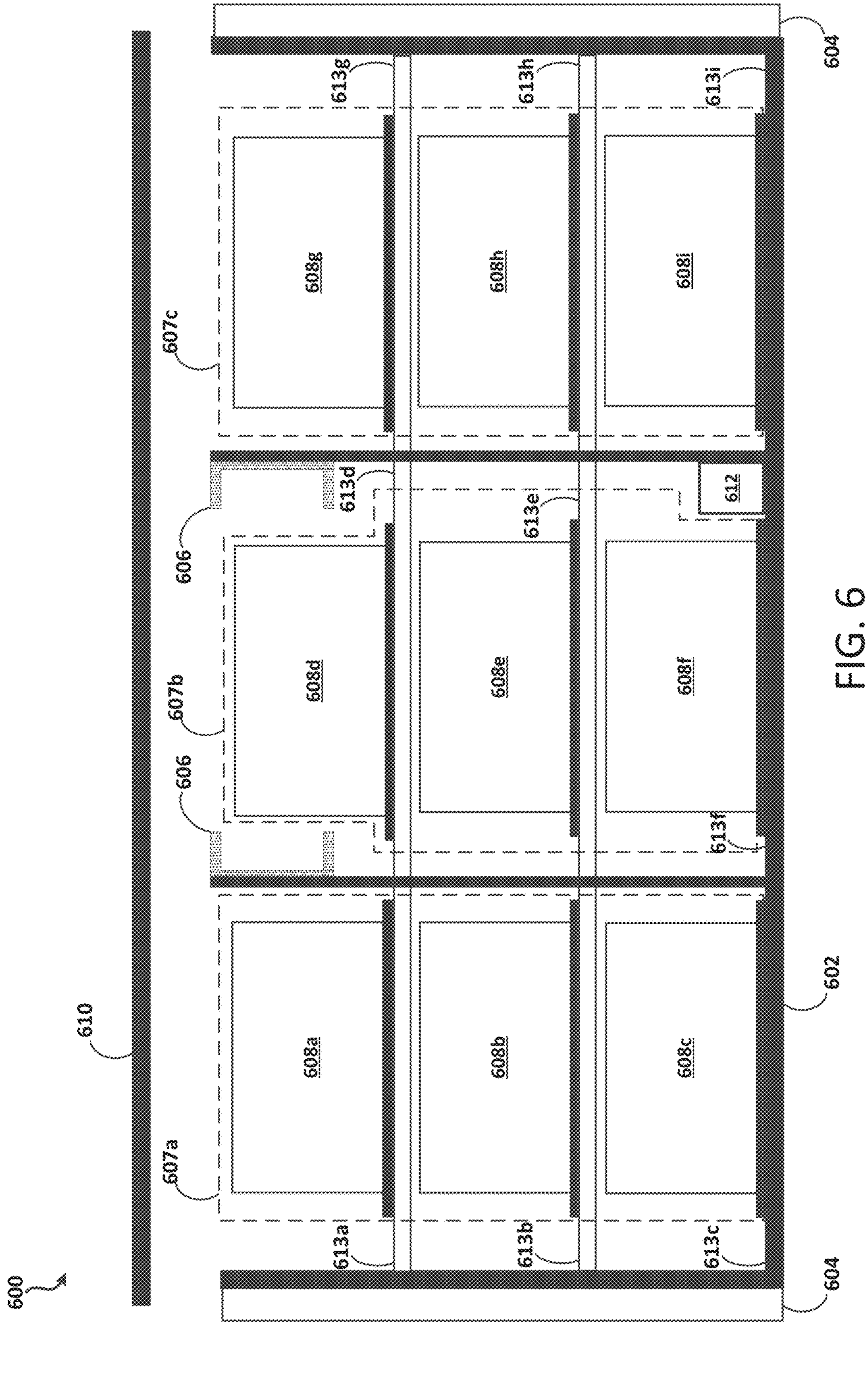
FIG. 6 shows an example electric vehicle battery module that includes shelving.

Additional affixing schema and means may include solid vertical support plates, each of the plurality of battery packs in a battery assembly may be stacked on shelves. FIG. 6 shows an example electric vehicle battery module 600 that includes shelving. The electric vehicle battery module 600 includes a container 602 configured to be mounted to frame rails 606 (i.e., C-channels) forming at least a portion of a frame of an electric vehicle. The electric vehicle battery module 600 includes a lid 610 configured to cover an open top of the container 602.

The electric vehicle battery module 600 includes a plurality of battery assemblies 607*a-c* enclosed within the container 602. The plurality of battery assemblies 607*a-c* may be connected to a power distribution unit (PDU). The plurality of battery assemblies 607*a-c* provide power to at least one component of the electric vehicle via the PDU. Optionally, connections 612 may be included inside of the container 602. For example, the connections 612 may include connections to a motor and/or inverter(s) of the electric vehicle.

The plurality of battery assemblies 607*a-c* may each include a plurality of battery packs. For example, the battery assembly 607*a* includes battery packs 608*a-c*, the battery assembly 607*b* includes battery packs 608*d-f*, and the battery assembly 607*c* includes battery packs 608*g-i*. The plurality of battery assemblies 607*a-c* may be separated from one another by internal vertical walls of the container 602. The container 602 may be mounted to frame rails 606 by bolting an upper portion of the internal vertical walls of the container 602 to the frame rails 606.

A plurality of shelves 613*a-i* may be bolted within the container 602. For example, the plurality of shelves 613*a-i* may be bolted in between the internal vertical walls of the container 602. Each of the plurality of shelves 613*a-i* may be configured to hold a battery pack 608*a-i*. For example, the shelf 613*a* may be configured to hold the battery pack 608*a*, the shelf 613*b* may be configured to hold the battery pack 608*b*, the shelf 613*c* may be configured to hold the battery pack 608*c*, the shelf 613*d* may be configured to hold the battery pack 608*d*, the shelf 613*e* may be configured to hold the battery pack 608*e*, the shelf 613*f* may be configured to hold the battery pack 608*f*, the shelf 613*g* may be configured to hold the battery pack 608*g*, the shelf 613*h* may be configured to hold the battery pack 608*h*, and the shelf 613*i* may be configured to hold the battery pack 608*i*. The plurality of shelves 613*a-i* may each be able to support the weight of at least one battery pack. For example, of each battery pack weighs 1000 pounds, each of the plurality of shelves 613*a-i* may be able to support a weight of at least 1000 pounds.

In some exemplars, the electric vehicle battery module 600 includes a layer of material 604 connected to at least one external side or end wall of the container 602. The layer of material may be configured to protect the plurality of battery assemblies 607*a-c* from damage. For example, the layer of material may be configured to protect the plurality of battery assemblies 607*a-c* from damage during impact. The layer of material 604 may be of any thickness. For example, the layer of material 604 may have a thickness of one, two, three, four, or five inches. The layer of material 604 may, for example, be connected to both external end walls of the container 602.

Figure 7:
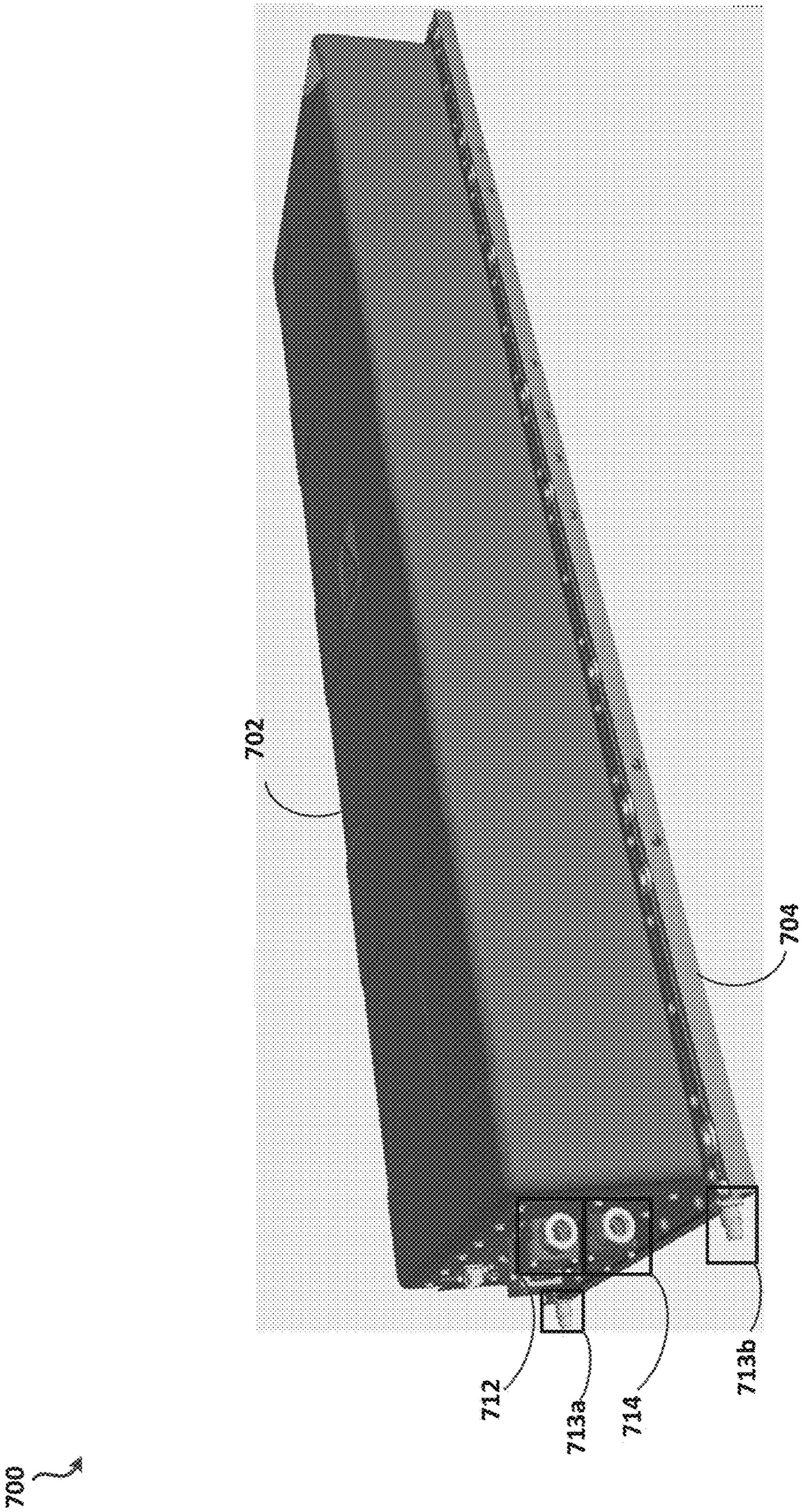
FIG. 7 shows an example battery pack for use in an electric vehicle battery module.

Any suitable battery pack may be utilized used in any of the battery assemblies described above with regard to FIGS. 2-6. FIG. 7 shows an isometric view of an example battery pack 700. The battery pack 700 may be used in any of the battery assemblies described above with regard to FIGS. 2-6. The battery pack 700 includes a battery stack and an enclosure 702 enclosing the battery stack. The battery cell may include a plurality of layers comprising a cathode with an active coating, a separator, and an anode with an active coating. The plurality of layers may be wound to form a jelly roll structure or can be stacked to form a stacked-cell structure. The plurality of layers may be enclosed within the enclosure 702 and immersed in an electrolyte.

The battery pack 700 includes an anode terminal 712 and a cathode terminal 710. The anode terminal 712 and the cathode terminal 710 may extend from the enclosure 702. The anode terminal 712 and the cathode terminal 710 may be connected to the battery stack. For example, the anode terminal 712 may be connected to an anode layer in the plurality of layers in the battery stack. Likewise, the cathode terminal 710 may be connected to a cathode layer in the plurality of layers in the battery stack.

In some exemplars, the battery pack 700 includes water cooling connections 713*a-b* that extend from the enclosure 702. The connection 713*a* may be an input nozzle, and the connection 713*b* may be an output nozzle. The connections 713*a-b* may be connected to a thermal control unit that is located in the accessory module (i.e., in the first module 102). Coolant may be run between the thermal control unit and the connections 713*a-b* so as to heat and cool the battery pack 700 sufficiently.

In some exemplars, the battery pack 700 includes a ledge 704. The ledge 704 may be used to bolt the battery pack 700 to other battery packs in a battery assembly. For example, as described above with regard to FIG. 5, a solid vertical support plate may be bolted onto the ledge 704 in order to connect the battery pack 700 to another battery pack in a battery assembly.

Figure 8:
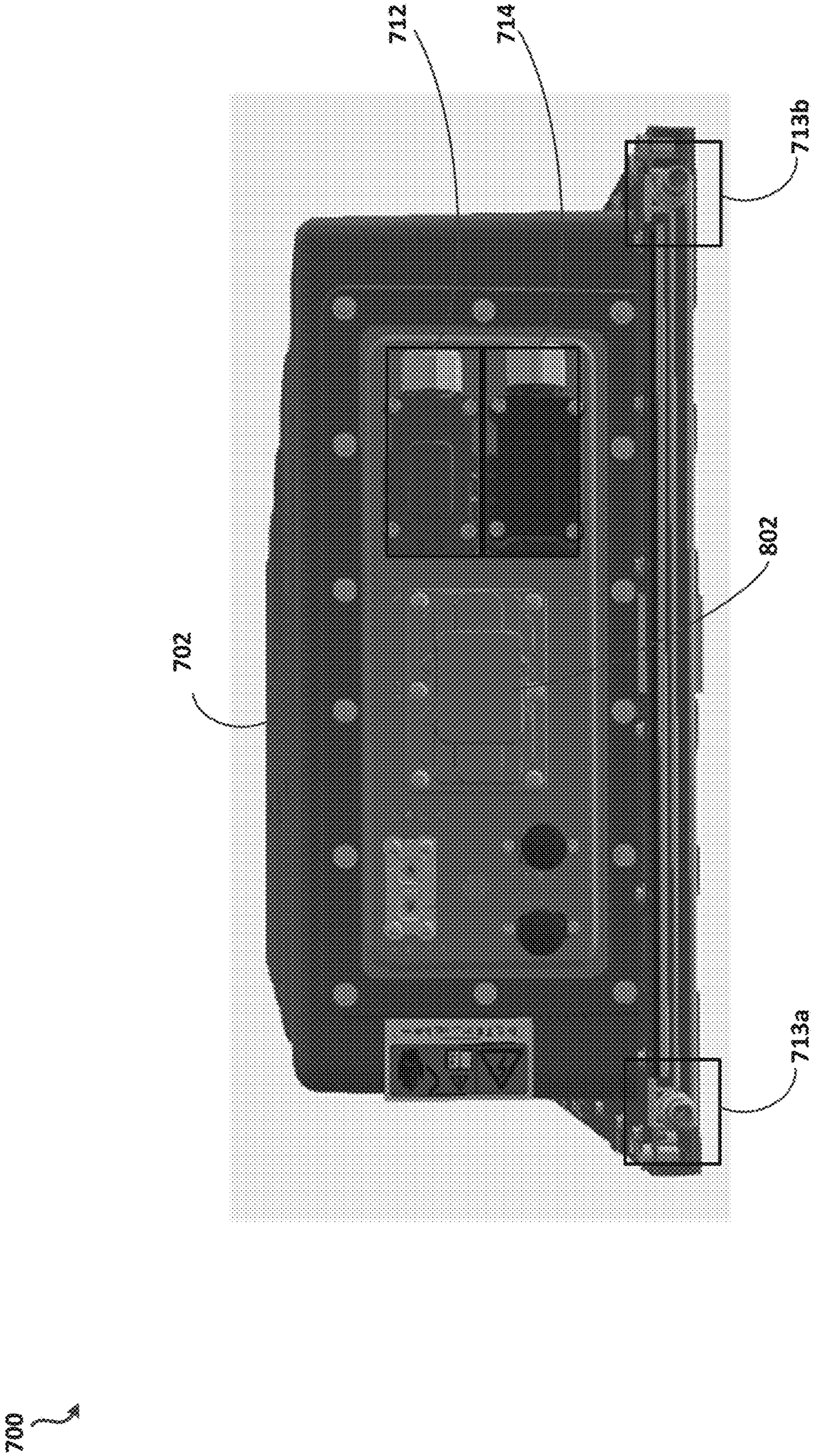
FIG. 8 shows connections of a battery pack for use in an electric vehicle battery module.

FIG. 8 shows a front-end view of the example battery pack 700. As mentioned above, the battery pack 700 includes an anode terminal 712 and a cathode terminal 710. The anode terminal 712 and the cathode terminal 710 may extend from the enclosure 702. The battery pack includes a manual service disconnect (MSD) 802. The MSD 802 is a manual maintenance protection switch with high-voltage interlock function. The MSD 802, when pulled out, is configured to disconnect the battery pack 700 and protect it from short circuits. As discussed above with regard to FIG. 5, no vertical support plates may be utilized on the front end of the battery assembly 700, the terminals 712 and 710 and the MSD 802 may need to be accessible.

Figure 9:
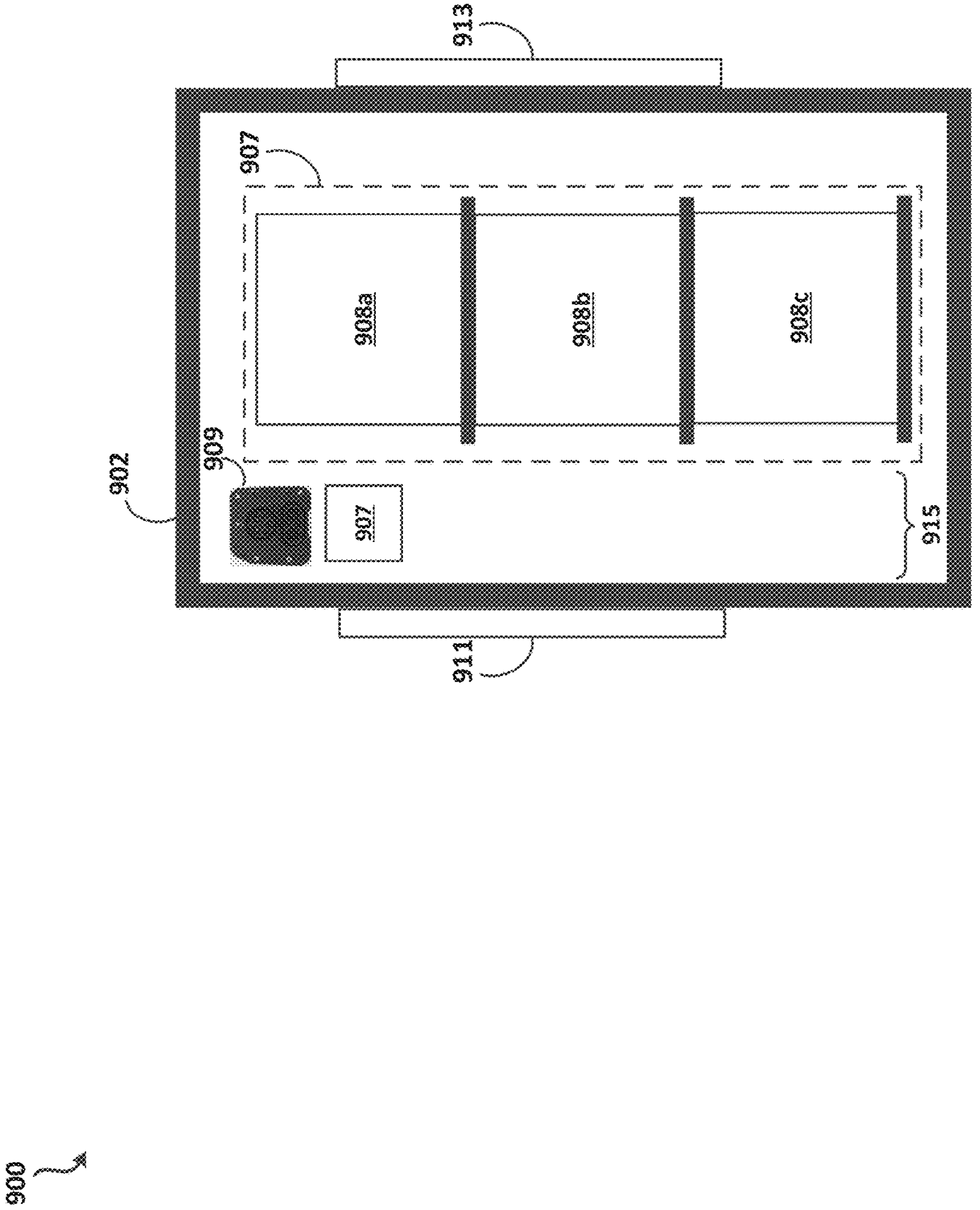
FIG. 9 shows an example side view of an electric vehicle battery module.

FIG. 9 shows a front-end view of an example electric vehicle battery module 900. The electric vehicle battery module 900 may be any of the electric vehicle battery modules described above (i.e., module 200, 300, 400, 600). The electric vehicle battery module 900 includes at least one battery assembly 907. The battery assembly 907 includes a plurality of battery packs 908*a-c*. The plurality of battery packs 908*a-c* may be stacked and bolted together, as described above with regard to FIG. 5. Alternatively, the plurality of battery packs 908*a-c* may be stacked on shelves that are bolted inside the container 902 as described above with regard to FIG. 6. The container 902 may be any of the containers described above (i.e., the container 202 with the lid 210, the container 302 with the plate 310, or the container 402 with the cover 410 and the plates 413*a-b*).

In some exemplars, the electric vehicle battery module 900 includes a manual service disconnect (MSD) 906. The MSD 902 is a manual maintenance protection switch with high-voltage interlock function. The MSD 902, when pulled out, is configured to disconnect the electric vehicle battery module 900 and protect it from short circuits. The electric vehicle battery module 900 includes a charging connector 909. The charging connector 909 may be mounted to at least one outer wall of the container 902 (such as the front-end). The charging connector 909 is configured to provide power to the battery assembly 907 from an external power source to recharge the battery assembly 907. A space 915 may be included in the electric vehicle battery module 900 for electrical connections. For example, the space 915 may be about three to five inches past the battery assembly 907.

In some exemplars, the electric vehicle battery module 900 includes connector plates 911, 913. The connector plate 911 may be bolted to the container 902. The connector plate 911 may be used to connect the electric vehicle battery module 900 to one or more components of the electric vehicle, such as the drive system and/or the accessory module. For example, the connector plate 911 may be used to provide low voltage power from the electric vehicle battery module 900 to one or more components of the electric vehicle, such as the drive system and/or the accessory module. The connector plate 913 may be used to connect the electric vehicle battery module 900 to one or more other components of the electric vehicle, such as motor and/or inverters.

As discussed above with regard to FIG. 7, each battery pack in the electric vehicle battery module 900 may include water cooling connections that extend from the enclosure. The connections may be connected to a thermal control unit that is located in the accessory module (i.e., in the first module 102). Coolant may be run between the thermal control unit and the connections so as to heat and cool each battery pack sufficiently. The electric vehicle battery module 900 may include a connector that connects the thermal control unit to each of the battery packs in the electric vehicle battery module 900.

Figure 10:
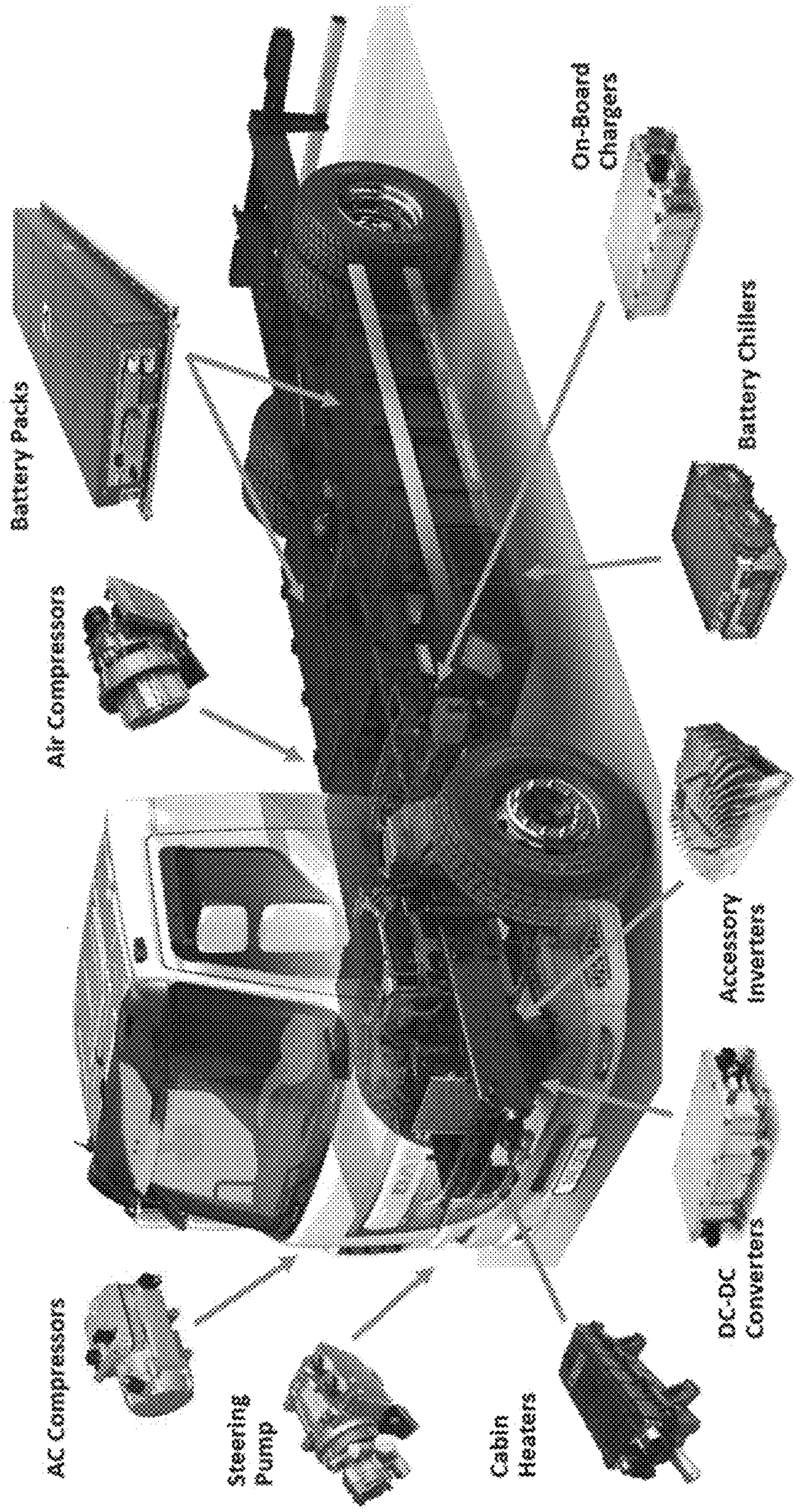
FIG. 10 shows an example components of an electric vehicle system that can be powered by an electric vehicle battery module.

FIG. 10 shows a diagram 1000 depicting the various components of an electric vehicle that may be powered by any of the electric vehicle battery modules described above with regard to FIGS. 1-9. These components are not limiting, and the electric vehicle battery modules described above with regard to FIGS. 1-9 may power different or additional components of an electric vehicle. The components that may be powered by any of the electric vehicle battery modules described above include: AC compressors, a steering pump, a cabin heater, a DC-DC converter, an accessory inverter, an air compressor, a battery chiller, and/or an on-board charger. Other components that are not depicted, such as a main driver inverter and/or a motor may additionally or alternatively be powered by any of the electric vehicle battery modules described above.

Figure 11:
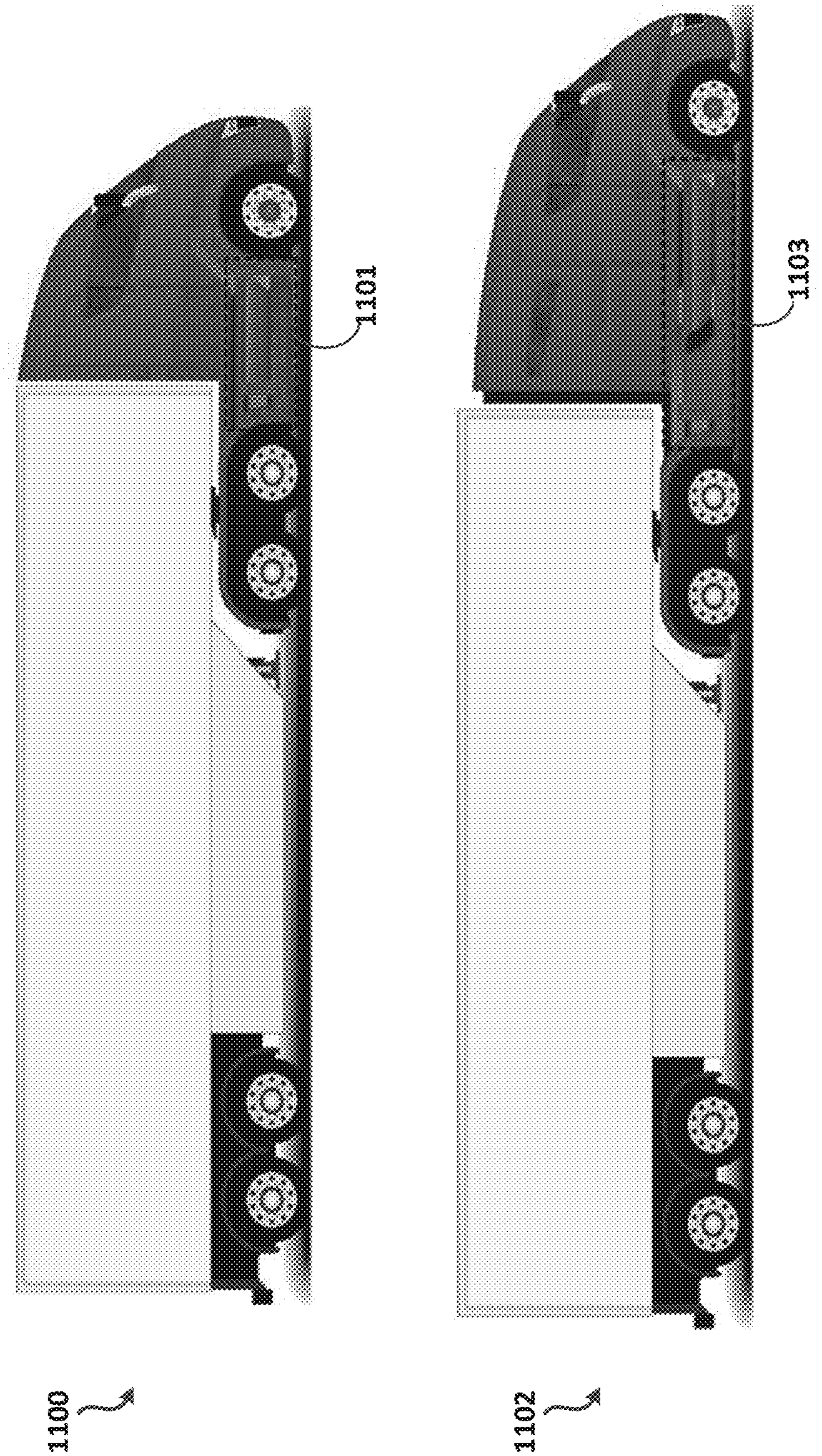
FIG. 11 shows example electric vehicle battery modules of different sizes.

FIG. 11 illustrates electric vehicle battery modules on two different trucks 1100 and 1102. The electric vehicle battery modules are located between the front axle and the front of the rear axle in both trucks 1100 and 1102. However, the trucks 1100 and 1102 have different sized wheelbases (i.e., distance between the front axle and rear axle). For example, the truck 1102 has a longer wheelbase than the truck 1100. Trucks with longer wheelbases, such as the truck 1102, may typically include a sleeper and may be used for driving longer distances. Due to the longer wheelbase, the truck 1102 may include a larger electric vehicle battery module than the truck 1101. As a result of the larger electric vehicle battery module, the truck 1102 may be able to drive longer distances than the truck 1100.

There are various popular truck models that exist today. Each of these truck models has its own unique styling and dimensional constraints. The electric vehicle battery modules described above with regard to FIGS. 1-9 may be utilized with each of these different styles of trucks. For example, if a truck includes steps for the driver to enter the vehicle, these steps may be bolted outside of the electric vehicle battery module. One stylistic different that exists between these various truck models is the frame rail spread (i.e., the distance between the frame rails). To accommodate these varying frame rail spreads, the vertical walls in the containers described above may have to be custom-built for each of the different frame rails spreads. Alternatively, the vertical walls in the containers may be spaced apart by a standard size, and spacer panels may be utilized to adjust for the varying frame railspreads.

Figure 12:
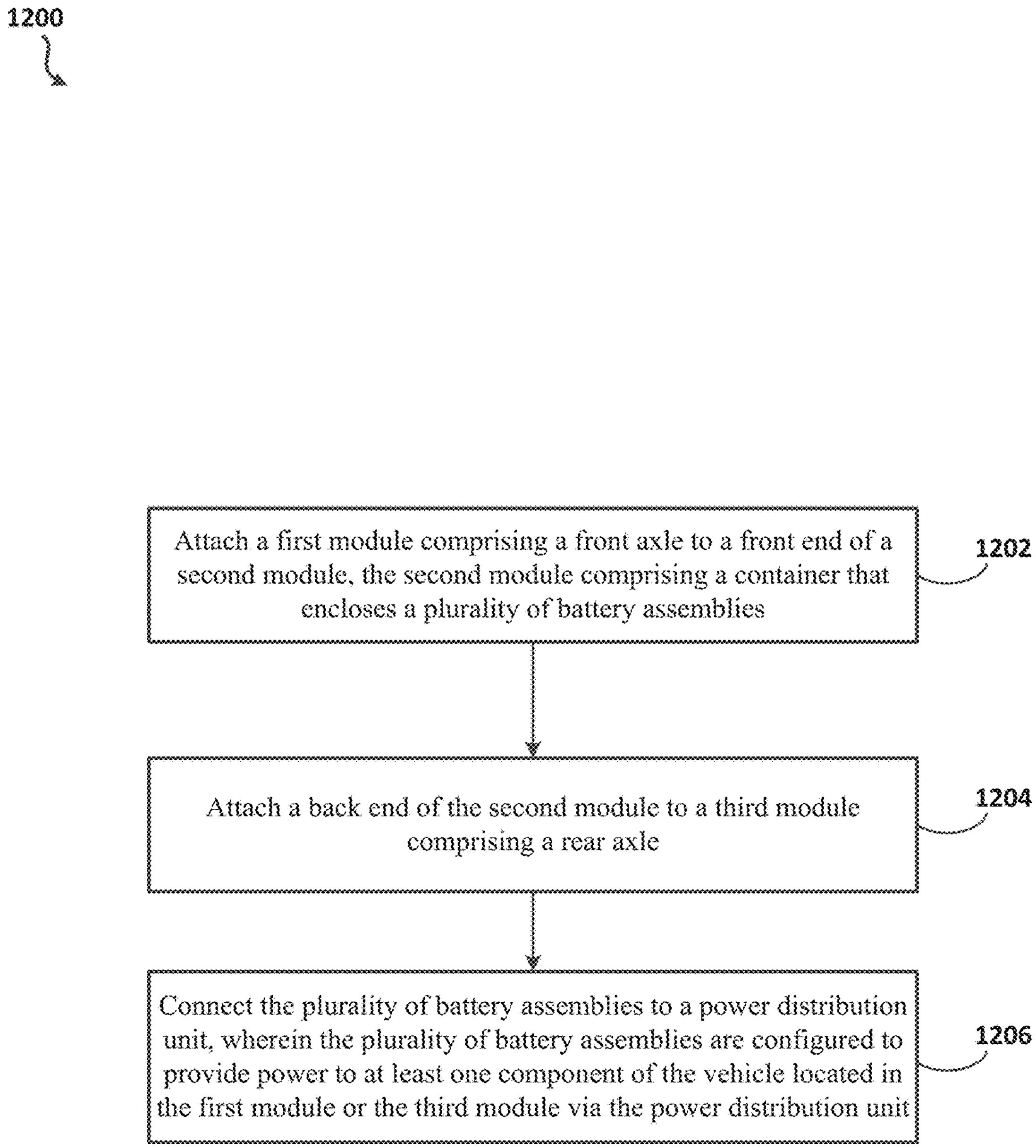
FIG. 12 illustrates an example method for assembling an electric vehicle chassis system.

FIG. 12 shows a method 1200 for assembling a modular chassis for an electric vehicle. At operation 1202, a first module may be attached to a front end of a second module. The first module may include mounts for a front axle, suspension, and steering of the electric vehicle. The first module may additionally include an accessory module associated with one or more accessories of the electric vehicle. The second module may be an electric vehicle battery module. For example, the second module may comprise a container that encloses a plurality of battery assemblies. The second module may be, for example, any of the electric vehicle battery modules described above with regard to FIGS. 1-9.

At operation 1204, a back end of the second module may be attached to a front end of a third module. For example, the second module may be connected to and interposed between the first module and the third module. The third module may comprise a rear axle of the vehicle. In some exemplars, the second module may be bolted to the first module and the third module so that the second module is positioned in between the first module and the third module. A traditional battery pack which may be in a container provide no structural strength and so the modules themselves just act as a large weight in the system. In some exemplars the containers disclosed herein affixed between a first and third module replace rails and eliminate the weight of said rails while also improving strength of the chassis by providing additional structural rigidity. Disclosed herein are container walls over double the height of traditional frame rails, such a container is configured to add strength to the chassis by way of the containers large vertical members. Typically, Typically a truck frame uses crossmembers to provide torsional rigidity. This ladder configuration reduces side loads from twisting a frame. By including a single large monolithic pack in the center of a truck either connecting a first module and a third module or over rails connecting the first module and a third module, the container provides torsional rigidity due to both the large vertical members of the enclosure oriented transversely to the vehicle axis.

In some instances the enclosure is constructed at least partially from composite materials which can provide a light weight yet strong structure which provide high strength.

In other exemplars, the second module may be connected to frame rails that run through the first module and the third module so that the second module is positioned in between the first module and the third module. For example, the second module may be positioned in between the first module and the third module so that the frame rails run though the second module. In this manner, the frame rails of the vehicle may be used to suspend the second module. By connecting the second module to existing frame rails, track manufacturers may be able to integrate the second module into an existing chassis without the need for time-consuming or expensive chassis redesign.

At operation 1206, the plurality of battery assemblies may be connected to a power distribution unit (PDU). As described above, the PDU may be located in the container or may instead be located in the first module, such as in the accessory module of the vehicle. The second module may be configured to provide power to at least one component of the electric vehicle. For example, the plurality of battery assemblies may provide power to at least one component of the electric vehicle via the PDU. The at least one component may be located in the first module and/or in the third module. For example, the at least one component can include a main driver inverter, a motor, a steering pump, an AC compressor, a DC-DC converter, a cabin heater, a cooling system, a charger, an air compressor, an accessory inverter, and/or any other component of the electric vehicle.

As used throughout this application, the word “may” is used in a permissive sense (i.e., meaning having the potential to), rather than the mandatory sense (i.e., meaning must). The words “include,” “including,” and “includes” and the like mean including, but not limited to. As used herein, the singular form of “a,” “an,” and “the” include plural references unless the context clearly dictates otherwise.

As used herein, the statement that two or more parts or components are “coupled” or “connected” shall mean that the parts are joined or operate together either directly or indirectly, i.e., through one or more intermediate parts or components, so long as a link occurs. As used herein, “directly coupled” means that two elements are directly in contact with each other. As used herein, “fixedly coupled” or “fixed” means that two components are coupled so as to move as one while maintaining a constant orientation relative to each other. Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

These drawings may not be drawn to scale and may not precisely reflect structure or performance characteristics of any given embodiment and should not be interpreted as defining or limiting the range of values or properties encompassed by example embodiments.

While systems and methods have been described in connection with the various embodiments of the various figures, it will be appreciated by those skilled in the art that changes could be made to the embodiments without departing from the broad inventive concept thereof. It is understood, therefore, that this disclosure is not limited to the particular embodiments disclosed, and it is intended to cover modifications within the spirit and scope of the present disclosure as defined by the claims. Also, as used in the specification including the appended claims, the singular forms “a,” “an,” and “the” include the plural, and reference to a particular numerical value includes at least that particular value, unless the context clearly dictates otherwise. The term “plurality”, as used herein, means more than one. When a range of values is expressed, another exemplar includes from the one particular value and/or to the other particular value. Similarly, when values are expressed as approximations, by use of the antecedent “about.” it will be understood that the particular value forms another exemplar. All ranges are inclusive and combinable.

As used in the specification and the appended claims, ranges may be expressed herein as from “about” one particular value, and/or to “about” another particular value. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

It is to be appreciated that certain features of the disclosure which are, for clarity, described herein in the context of separate exemplar, may also be provided in combination in a single exemplary implementation. Conversely, various features of the disclosure that are, for brevity, described in the context of a single exemplary implementation, may also be provided separately or in any sub-combination. Further, reference to values stated in ranges include each and every value within that range.

What is claimed is:

1. A method for assembling a chassis for a vehicle, the method comprising: attaching a first module comprising a front axle to a front end of a second module, the second module comprising a container, mounted between frame rails configured as part of the vehicle chassis, that encloses a plurality of battery assemblies; and attaching a back end of the second module to a third module comprising a rear axle, wherein the plurality of battery assemblies are configured to provide power to at least one component of the vehicle located in the first module or the third module via a power distribution unit and wherein the second module further comprises a plate to which the plurality of battery assemblies are configured to be mounted, and wherein the plurality of battery assemblies are configured to be inserted into the container by lifting the plate including the mounted plurality of battery assemblies into an open bottom of the container.

2. The method of claim 1, wherein each of the plurality of battery assemblies comprises a plurality of battery packs that are stacked and bolted together.

3. The method of claim 1, wherein a plurality of shelves are mounted within the container, and wherein each of the plurality of battery assemblies comprises a plurality of battery packs that are stacked on the plurality of shelves.

4. The method of claim 1, wherein the second module further comprises a lid configured to cover an open top of the container enclosing the plurality of battery assemblies.

5. The method of claim 1, wherein the plurality of battery assemblies are configured to be removed from the container by lowering the plate including the mounted plurality of battery assemblies from the open bottom of the container.

6. The method of claim 1, wherein the second module further comprises at least one connection plate mounted to at least one outer wall of the container, the at least one connection plate configured to provide power from the plurality of battery assemblies to the at least one component of the vehicle.

7. The method of claim 1, wherein the second module further comprises a charging connector mounted to at least one outer wall of the container, the charging connector configured to provide power to the plurality of battery assemblies from an external power source to recharge the plurality of battery assemblies.

8. The method of claim 1, wherein the vehicle is a truck, a van, or a trailer.

9. The method of claim 1, wherein the second module is configured to distribute electrical power.

10. The method of claim 1, wherein the second module provides torsional rigidity to the chassis due to at least one or more large vertical members of the enclosure oriented transversely to a vehicle axis.

* * * * *